7/7/87 RE 32,456

United States Patent [19]

Ishii

[11] E Patent Number: Re. 32,456

[45] Reissued Date of Patent: Jul. 7, 1987

[54] BATTERY POWERED DRAWER OPENING DEVICE

[75] Inventor: Shiro Ishii, Garden Grove, Calif.

[73] Assignee: M-S Corporation, Stanton, Calif.

[21] Appl. No.: 815,819

[22] Filed: Jan. 2, 1986

Related U.S. Patent Documents

Reissue of:

[64] Patent No.: 4,424,426
Issued: Jan. 3, 1984
Appl. No.: 391,911
Filed: Jun. 24, 1982

[51] Int. Cl.[4] ..... H01H 3/16

[52] U.S. Cl. ..... 200/61.61; 200/61.62; 235/22

[58] Field of Search ..... 235/7, 10, 11, 22; 200/61.61, 61.62; 292/108, 210, 229; 340/570

[56] References Cited

U.S. PATENT DOCUMENTS

| | | | |
|---|---|---|---|
| 3,708,773 | 1/1973 | Ishii | 235/11 X |
| 3,855,432 | 12/1974 | Kelly et al. | 235/22 X |
| 4,101,745 | 7/1978 | Smith | 200/61.61 |

OTHER PUBLICATIONS

Berkman, J. W., IBM Tech. Disc. Bull., Multiple Cash Drawer Control, vol. 10, No. 12, May 1968, pp. 1928, 1929.

*Primary Examiner*—Benjamin R. Fuller
*Attorney, Agent, or Firm*—Wenderoth, Lind, & Ponack

[57] ABSTRACT

A battery driven cash drawer provided with a latching arrangement in which a solenoid energizable by a battery operates to rotate a latch lever release arm pivotally mounted to the cash drawer casing, out of engagement with an extended portion of a latch lever. The latch lever is also pivotally mounted to the casing. The release arm is connected to the latch lever through a latching spring which biases the lever and release arm into engagement. The latch lever also includes a hook shaped portion which is pivotally engageable with a drawer latch member fixed to the rear of the drawer tray. A remote switch operates to couple the solenoid to the battery. When the latch lever is engaging the latch member to hold the drawer tray in its casing, energization of the solenoid causes the release arm to rotate so as to disengage the latch lever and rotate the hook portion of the latch lever out of engagement with the drawer latch member. A drawer pushing spring then pushes the drawer tray out of the casing.

20 Claims, 8 Drawing Figures

BATTERY POWERED DRAWER OPENING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to cash drawers and more particularly to a cash drawer which may be opened by a battery operated latch.

2. Description of the Prior Art

Conventional cash drawers are closed manually and are opened either mechanically or with the use of electrical power provided from AC electric power lines. For example, one prior AC powered cash drawer which is particularly designed to reduce electric power usage and operate simply and reliably and may be manufactured at a low cost, is disclosed in U.S. Pat. No. 3,708,773, issued to the present Applicant in 1973. Conventional electrically opened cash drawers of this kind can be located only where AC power lines are available and in the event of a power failure will not operate.

It is therefore an object of the present invention to provide an electrically operated cash drawer having its own source of electric power.

It is also an object of the invention to provide an inexpensive DC battery operated cash drawer which operates effectively and reliably with a minimum number of inexpensive parts using a minimum amount of electric power.

It is a further object of the invention to provide such a cash drawer which may be electrically opened from any location without relying on an outside power supply.

SUMMARY OF THE INVENTION

In accordance with the invention, there is provided a battery driven automatic cash drawer opening arrangement. The drawer may be opened with a remotely located push button. The invention includes a latching and solenoid arrangement which minimizes the electrical energy required to open the drawer and therefore minimizes drainage of the battery.

The arrangement includes a latch member, such as a bar fixed to the drawer tray, engageable with a hook portion of a latch lever which is pivotally mounted to the casing, preferably on one side of an upwardly extending bracket. On the other side of the bracket is pivotally mounted a latch lever release arm. One end of the latch lever release arm is engageable with another end portion of the latch lever to hold the latch lever in such a rotational position as to retain the latch member in its hook portion. A first spring extending between the latch lever and the release arm biases the latch member and latch lever into engagement. A solenoid which may be actuated by a small battery through a push button switch is mounted to the casing at the rear interior portion thereof and is coupled to the release arm so as to rotate the release arm out of engagement with the latch lever when the solenoid is actuated. The first spring is connected between the latch lever and the release arm so as to rotate the latch lever so that its hook portion disengages from the latch member mounted to the cash drawer. A second spring is mounted between the casing and the drawer tray so as to urge the drawer tray out of the casing when the hook portion of the latch lever is disengaged from the latch member.

In accordance with another aspect of the invention, another portion of the latch lever is slidingly engaged by the latch member to rotate the latch lever into engagement with the release arm when the drawer tray is pushed into the casing.

In accordance with still another aspect of the invention, the portion of the release arm which engages the latch lever projects at the one end in a direction parallel to the axis of rotation of the latch lever to provide a surface facing that axis which makes flush contact with an edge portion of the latch lever when the drawer tray is fully inserted into the casing. The angles of the engaging edge and surface of the latch lever and release arm, respectively, are such as to provide for a smooth and energy efficient disengagement of the latch lever from the latch member and release arm when the solenoid is energized, and yet a secure locking of the latch lever with the latch member and the release arm when the drawer is closed and the solenoid is not being energized.

BRIEF DESCRIPTION OF THE DRAWINGS

These and other aspects and advantages of the invention may be more fully understood from the following detailed description of a preferred embodiment when taken with the accompanying drawings in which.

DETAILED DESCRIPTION OF THE PREFERRED EMBODIMENT

Figure 1:
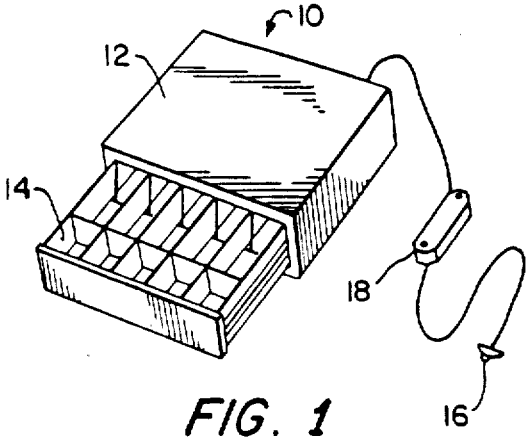
FIG. 1 is a perspective view of the cash drawer in accordance with the present invention.

Referring first to FIG. 1, there is shown a perspective view of a cash drawer 10 having a casing 12 for a drawer tray 14. The cash drawer is closed manually and may be opened with the aid of a remote control switch 16 coupled to a latching mechanism inside the cash drawer powered by a battery provided in a suitable battery case 18.

Figure 2:
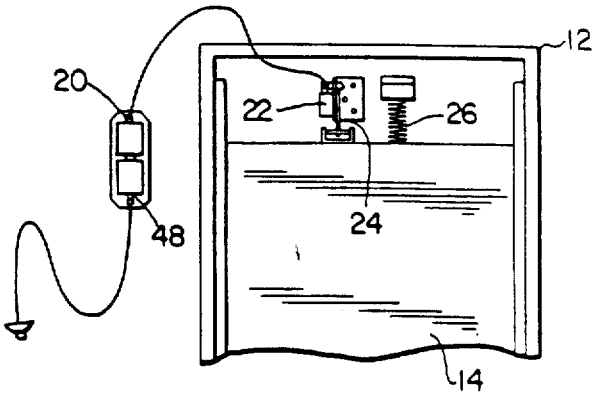
FIG. 2 is a bottom view of a portion of the cash drawer shown in FIG. 1 with the bottom surface of the cash drawer casing removed for clarity.

Referring now to FIG. 2, terminal 20 of battery case 18 is electrically coupled to a solenoid 22 mounted to casing 12. Solenoid 22 is a component of a drawer latch assembly 24 for holding drawer tray 14 inside casing 12. Also shown in FIG. 2 is a push spring 26 mounted between a rear portion of casing 12 and a rear panel of drawer tray 14 in order to urge the drawer tray 14 from casing 12 when the latch assembly 24 is in a state of disengagement.

Figure 3:
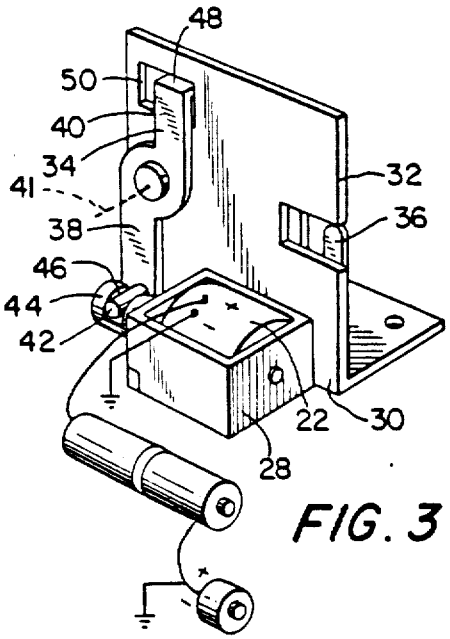
FIG. 3 is a perspective view of the remote control switch, batteries and one side of the latch assembly in accordance with the present invention.

Referring now to FIG. 3, solenoid 22 is mounted in a casing 28 which is in turn fixed to one vertical side 30 of an L-shaped bracket 32 fixed to the base of casing 12. L-shaped bracket 32 pivotally supports latch members 34 and 36 of latch assembly 24 as will be described below.

Latch member 34 is a latch lever release arm which is pivotally mounted to side 30 of bracket 32 and includes extended portions 38 and 40 extending vertically in opposite directions along parallel lines on opposite sides of its axis of rotation 41. The bottom end of the extended portion 38 has a pin 42 extending outwardly thereof pivotally mounted in a vertical slot 46 in solenoid plunger 44 which is mounted to solenoid casing 28 so as to be drawn inwardly of the solenoid when the solenoid 22 is energized. Accordingly, when solenoid 22 is energized, solenoid plunger 44 is drawn inwardly engaging pin 42 to rotate latch lever release arm 34 about its axis of rotation. An end portion 48 of extended portion 40 of latch lever release arm 34 extends in a direction opposite that of pin 42 through an opening 50 in bracket 32 to engage a portion of latch lever 36 as will be described.

Figure 4:
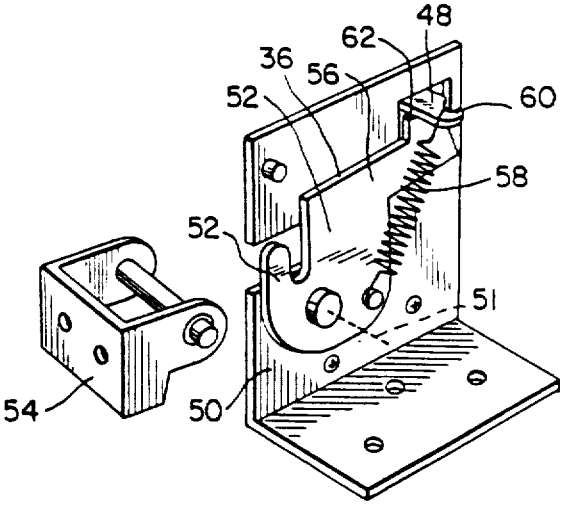
FIG. 4 is a perspective view of the other side of the latch assembly in accordance with the present invention.

Referring now to FIG. 4, latch lever 36 is pivotally mounted to the opposite side 50 of bracket 32 for rotation about an axis of rotation 51 parallel to axis 41 of latch lever release arm 34. Latch lever 36 includes a J-shaped hook portion 52 for engaging a drawer latch member 54 mounted to the rear panel of drawer tray 14, and an extended portion 56 generally extending toward engagement portion 48 of latch lever release arm 34. A latching spring 58 is fixed at opposite ends to the tip 60 of engagement portion 48 and to latch lever 36 at a location adjacent to the axis of rotation 51 of latch lever 36 on the side thereof closest to engagement portion 48 of latch lever release arm 34 when engagement portion 48 is in engagement with latch lever 36. Latching spring 58 serves to urge top edge 62 of latch lever 36 into flush engagement with the generally planar undersurface 64 of engagement portion 48 of latch lever release arm 34 as will be described below. Latching spring 58 has a much lesser biasing force than that of drawer opening spring 26.

Figure 5:
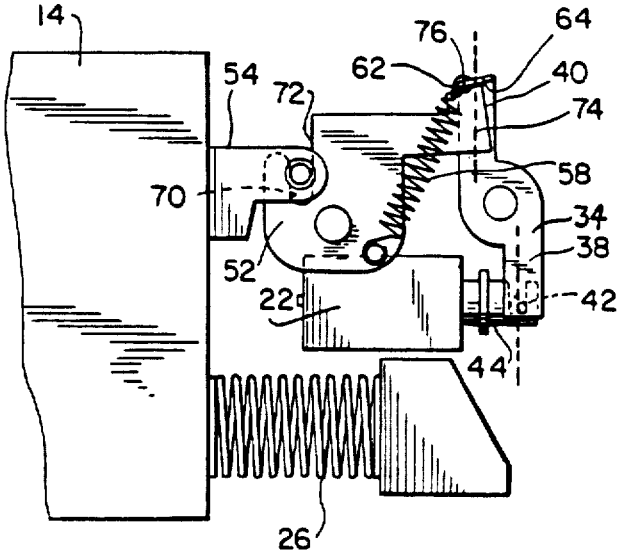
FIG. 5 is a side view of the latch assembly in accordance with the present invention in a locked state with parts removed for clarity.

Referring now to FIG. 5, which is a partially schematic illustration of the invention showing the operative portions thereof in a closed drawer position prior to actuation of the solenoid, it will be observed that undersurface 64 of engagement portion 48 and top edge 62 of latch lever 36 are angled so as to be flush with each other, edge 62 being at an acute an angle to lines along which extended portions 38 and 40 extend, so as to face the axis of rotation 41 of latch lever release arm 34.

The operation of the present invention may now be described with reference to FIGS. 5–8. Referring to FIG. 5, wherein the drawer tray 14 is in a closed position and the solenoid 22 is not energized, latch lever release arm 34 extends generally vertically from solenoid plunger 44, which is in an outward position relative to solenoid 22, drawer latch member 54 is in engagement with the opposing surfaces 70 and 72 of hook portion 52 of latch lever 36, and drawer opening spring 26 is compressed against the rear panel of drawer tray 14.

Figure 6:
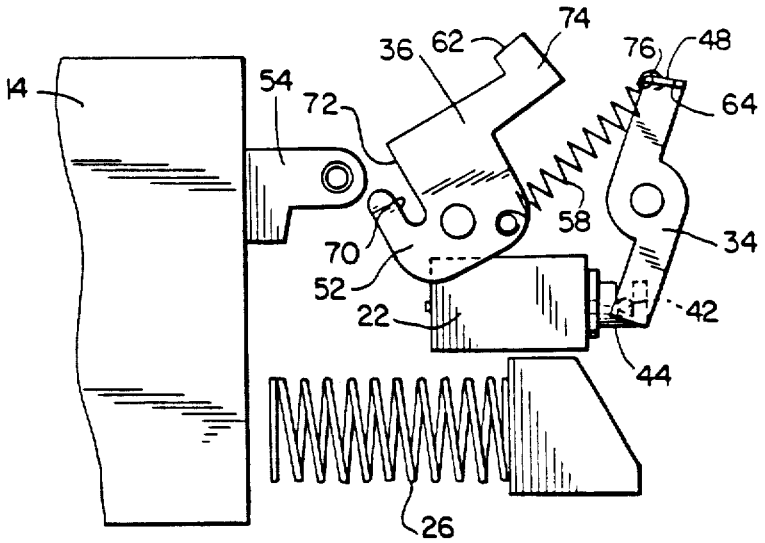
FIG. 6 is a side view of the parts illustrated in FIG. 5 when the latch assembly is in an unlocked state with the latch assembly opening solenoid actuated.

Referring now to FIG. 5 and FIG. 6, the elements of the latching arrangement of the present invention are schematically illustrated in the positions which they take after the solenoid 22 has been energized to draw solenoid plunger 44 inwardly to release latch lever 36 from drawer latch member 54 so that drawer opening spring 26 pushes drawer tray 14 out of casing 12 (not shown in FIGS. 5 and 6). When solenoid plunger 44 is drawn into solenoid 22, latch lever release arm 34 is rotated so that the leftmost edge of undersurface 64 engages the rightmost corner of top edge 62. As this occurs, drawer opening spring 26 beings to push drawer tray 14 outward whereby drawer latch member 54 rotates hook portion 52 downward against the bias of latching spring 58, as illustrated in FIG. 6. Drawer opening spring 26 then continues to push the drawer tray 14 out of casing 12.

Figure 7:
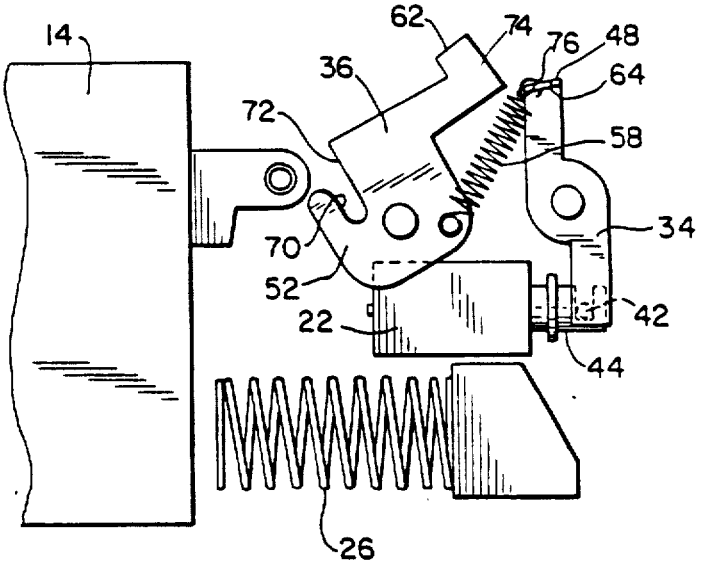
FIG. 7 is a side view of the parts illustrated in FIG. 5 in an unlatched state while the solenoid is not actuated.
Figure 8:
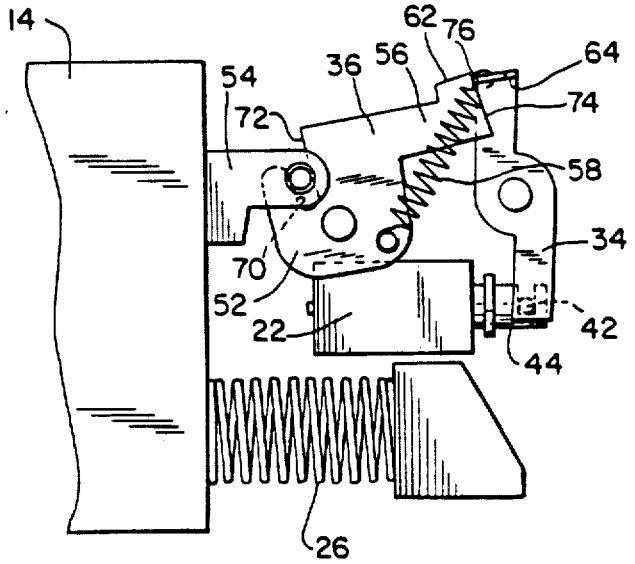
FIG. 8 is a side view of the elements shown in FIG. 5 while the cash drawer is being inverted into its casing.

When the solenoid 22 is deactivated, as illustrated in FIG. 7, solenoid plunger 44 once again returns to an outward position, rotating latch lever release arm 34 into an upright position and releasing the tension in latching spring 58, but maintaining latch lever release arm 34 and latch lever 36 out of engagement. Referring to FIG. 8, when drawer tray 14 is manually pushed into casing 12, drawer latch member 54 engages the upper portion of surface 72 of latch lever hook portion 52 to rotate latch lever 36 (clockwise) as in FIG. 8. Drawer latch member 54 slides downward relative to hook portion 52 into the space between hook portion surfaces 70 and 72. During this clockwise rotation of latch lever 36, an outside edge 74 of latch lever extended portion 56, which edge extends generally perpendicular to upper edge 62, slidingly engages the inside edge 76 of latch lever release arm engagement portion 48 to rotate latch lever release arm 34 slightly in a clockwise direction and slightly to expand latching spring 58. As the drawer continues to be moved inward, edge 76 of engagement portion 48 reaches the top end of outside edge 74 of latch lever 36 and latch lever release arm 34 snaps back in a counterclockwise direction in response to the bias of a latching spring 58 such that engagement portion bottom surface 64 is in flush engagement with the upper edge 62 of latch lever 36 to hold the hook portion 52 of latch lever 36 in secure engagement with drawer latch member 54.

It will be appreciated by those of ordinary skill in the art to which the invention pertains that although only a single exemplary embodiment of the invention has been hereinabove described, there are many modifications which may be made fully within the scope of the invention, which is limited only by the appended claims.

What is claimed is:

1. An electrically opening drawer assembly comprising:

[a.] a casing;

[b.] a drawer tray slidable into and out of said casing;

[c.] a first latch member fixed to said drawer tray;

[d.] a second latch member pivotally mounted to said casing for rotation about a first mounting axis, having a hook portion engageable with said first latch member when said second latch member is in a first rotational position to hold said drawer tray inside said casing, said first latch member being spaced from said first mounting axis in a first direction radially outwardly extended from said first mounting axis, said second latch member having a first extended portion radially extending from said first mounting axis;

[e.] a solenoid fixed in said casing, [and means, electrically capable of being coupled to said solenoid, for energizing said solenoid in response to] *energizable by* an applied [DC] voltage;

[f. switch means for coupling said energizing means to said solenoid to apply said DC voltage to said solenoid;

g.] a third latch member pivotally mounted to said casing for rotation about a second mounting axis, having a second extended portion extending generally radially outwardly from said second mounting axis and engageable at an end thereof spaced from said second mounting axis with an end of said first extended portion spaced from said first mounting axis;

[h.] means, responsive to energization of said solenoid by said [DC] voltage, for rotating said second extended portion about said second mounting axis so as to disengage said first extended portion from said second extended portion;

[i.] first spring means, coupling said first and second extended portions, for biasing said first and second extended portions into engagement; and

[j.] second spring means for rotating said second latch member to disengage said hook portion from said first latch member and for urging said drawer tray out of said casing when said first latch member is disengaged from said hook portion.

2. A drawer assembly as in claim 1, wherein said second latch member comprises means for engaging with said first latch member to rotate said second latch member so that said first extended portion engages said second extended portion when said drawer tray is pushed into said casing.

3. A drawer assembly as in claim 1, wherein said third latch member includes a third extended portion extending radially outwardly of said second mounting axis, said rotating means including a magnetic field responsive element pivotally coupled to an end of said third extended portion spaced from said second mounting axis, and movable in response to energization of said solenoid to rotate said second and third extended portions about said second mounting axis.

4. A drawer assembly as in claim 1, wherein said rotating means comprises means for fixing said second extended portion against rotation when said solenoid is not actuated and wherein said second extended portion includes an engagement portion, located at said end of said second extended portion, extending generally parallel to said second mounting axis, said engagement portion engaging said end of said first extended portion when said second latch member is in said first rotational position in engagement with said first latch member, said engagement portion fixing said second latch member against rotation out of engagement with said first latch member when said second latch member is in said first rotational position engaging said first latch member and said solenoid is not actuated.

5. A drawer assembly as in claim 4, wherein said third latch member includes a third extended portion extending radially outwardly of said second mounting axis, said rotating means including a magnetic field responsive element pivotally coupled to an end of said third extended portion spaced from said second mounting axis and movable in response to energization of said solenoid to rotate said second and third extended portions about said second mounting axis, said second and third extended portions each having end portions extending in opposite directions along lines spaced from and on opposite sides of said second mounting axis, said engagement portion having a generally planar face facing said second mounting axis at an angle to said spaced lines, said first extended portion having an upper edge angled so as to lie flush against said generally planar face of said engagement portion when said second latch member is in said first rotational position.

6. A drawer assembly as in claim 5, wherein the distance between said first latch member and said first mounting axis when said second latch member is in said first rotational position and said hook member is engaging said first latch member is substantially shorter than the distance between said first mounting axis and said upper edge.

7. A drawer assembly as in claim 4, wherein said first spring means includes a spring connected at opposite ends to said engagement portion and an end of said first extended portion adjacent to said first mounting axis.

8. A drawer assembly as in claim 4, wherein said second latch member comprises means for engaging with said first latch member to rotate said second latch member so that said first extended portion engages said second extended portion when said drawer tray is pushed into said casing;

said engagement portion having a generally planar face generally facing said second mounting axis and said generally planar face having an inside edge extending generally parallel said second mounting axis;

said first extended portion having an end portion having an outside edge and an upper edge continuous with said outside edge at an end point thereof and extending generally perpendicular thereto, said outside and upper edges being located such that when said drawer tray is continuously pushed into said casing and said first latch member engages said second latch member to rotate said second latch member, said inside edge slidingly engages said outside edge and rotates said third latch member against the bias of said first spring means such that said inside edge slides along said outside edge to said end point and said third latch member then snaps back in response to the bias of said first spring means to bring said upper edge into flush engagement with said planar face.

9. A drawer assembly as in claim 8, wherein said third latch member includes a third extended portion extending radially outwardly of said second mounting axis, said rotating means including a magnetic field responsive element pivotally coupled to an end of said third extended portion spaced from said second mounting axis and movable in response to energization of said solenoid to rotate said second and third latch members about said second mounting axis; said second and third extended portions each having end portions extending in opposite directions along lines spaced from and on opposite sides of said second mounting axis, said planar face facing said second mounting axis at an angle to said spaced lines, said first extended portion having an upper edge angled so as to lie flush against said generally planar face of said engagement portion when said second latch member is in said first rotational position; said engaging means comprising an edge of said hook portion which extends in a direction which is generally parallel to said spaced lines when said second latch member is in said first rotational position.

10. A drawer assembly as in claim 8, wherein said third latch member further comprises a third extended portion extending generally radially outwardly from said second mounting axis generally toward said solenoid, said rotating means including means, coupled to said third extended portion and responsive to energization of said solenoid, for rotating said second and third extended portions about said second mounting axis; said second extended portion having an end portion extending along a line spaced from said second mounting axis, said planar face facing said second mounting axis at an angle to said spaced line, said first extended portion having an upper edge angled so as to lie flush against said generally planar face of said engagement portion when said second latch member is in said first rotational position.

11. A drawer assembly as in claim 4, wherein said third latch member further comprises a third extended portion extending generally radially outwardly from said second mounting axis generally toward said solenoid, said rotating means comprising means, coupled to said third extended portion and responsive to energization of said solenoid, for rotating said second and third extended portions about said second mounting axis; said second extended portion having an end portion extending along a line spaced from said second mounting axis, said engagement portion having a generally planar face facing said second mounting axis at an angle to said spaced line, said first extended portion having an upper edge angled so as to lie flush against said generally planar face of said engagement portion when said second latch member is in said first rotational position.

12. A drawer assembly as in claim 1, further comprising means for pivotally mounting said second and third latch members to said casing; said mounting means including a bracket fixed to said casing, and means for pivotally mounting said second and third latch members to said bracket.

13. A drawer assembly as in claim 12, wherein said rotating means comprises means for fixing said second extended portion against rotation when said solenoid is not actuated and wherein said bracket includes a planar portion having opposite first and second sides, said second latch member and said solenoid being mounted to said first side and said third latch member and said solenoid being mounted to said second side, said planar member having a first opening along an edge thereof adjacent said hook portion for removably receiving said first latch member when said second latch member is in said first rotational position, and a second opening, said second extended portion including an engagement portion, located at said end of said second extended portion, extending generally parallel to said second mounting axis through said second opening, said engagement portion engaging said end of said first extended portion when said second latch member is in said first rotational position and said hook portion is in engagement with said first latch member, said engagement portion fixing said second latch member against rotation out of engagement with said first latch member when said second latch member is in said first rotational position engaging said first latch member and said solenoid is not actuated.

14. A drawer assembly as in claim 1, wherein said third latch member further comprises a third extended portion extending generally radially outwardly from said second mounting axis generally towards said solenoid, said rotating means comprising means, coupled to said third extended portion and responsive to energization of said solenoid, for rotating said second and third extended portions about said second mounting axis.

[15. A drawer assembly as in claim 1, wherein said energizing means comprises a DC battery, and said switch means comprises a push button.]

16. A drawer assembly as in claim 1, wherein said first latch member comprises a bar fixed in a position spaced from said drawer and said second latch member rotates upward into said first rotational position whereat said hook portion engages said first latch member.

17. A drawer assembly as in claim 1, wherein said hook portion comprises a J-shaped portion having a long interior edge and a short interior edge opposing said long interior edge and spaced from said long interior edge in a direction extending away from said first latch member; said long interior edge slidingly engaging said first latch member to rotate said second latch member when said drawer tray is being pushed into said casing, whereby said first extended portion rotates into engagement with said second extended portion.

*18. A drawer assembly as in claim 1, wherein said solenoid is energizable by a D.C. voltage applied thereto.*

*19. A drawer assembly as in claim 18, further comprising means, electrically coupleable to said solenoid, for energizing said solenoid by applying a D.C. voltage thereto.*

*20. A drawer assembly as in claim 19, further comprising switch means for coupling said energizing means to said solenoid to apply said D.C. voltage to said solenoid.*

*21. A drawer assembly as in claim 20, wherein said energizing means comprises a DC battery, and said switch means comprises a push button.*

* * * * *